(12) United States Patent
Fadel Argerich et al.

(10) Patent No.: US 11,809,977 B2
(45) Date of Patent: Nov. 7, 2023

(54) WEAKLY SUPERVISED REINFORCEMENT LEARNING

(71) Applicant: NEC Laboratories Europe GmbH, Heidelberg (DE)

(72) Inventors: Mauricio Fadel Argerich, Heidelberg (DE); Jonathan Fuerst, Heidelberg (DE); Bin Cheng, Sandhausen (DE)

(73) Assignee: NEC LABORATORIES EUROPE GMBH, Heidelberg (DE)

(*) Notice: Subject to any disclaimer, the term of this patent is extended or adjusted under 35 U.S.C. 154(b) by 800 days.

(21) Appl. No.: 16/785,692

(22) Filed: Feb. 10, 2020

(65) Prior Publication Data
US 2021/0150417 A1    May 20, 2021

Related U.S. Application Data

(60) Provisional application No. 62/935,101, filed on Nov. 14, 2019.

(51) Int. Cl.
*G06N 20/20* (2019.01)

(52) U.S. Cl.
CPC .................. *G06N 20/20* (2019.01)

(58) Field of Classification Search
CPC ...... G06N 20/20; G06N 3/006; G06N 3/0454; G06N 3/084; G06N 7/005
See application file for complete search history.

(56) References Cited

U.S. PATENT DOCUMENTS

| 11,029,694 B2* | 6/2021 | Ma .......................... G06N 20/00 |
| 2004/0044546 A1* | 3/2004 | Moore ................... G16H 50/20 |
| | | 705/2 |
| 2017/0279849 A1 | 9/2017 | Weibel et al. |
| 2018/0342069 A1 | 11/2018 | Lim et al. |
| 2019/0250568 A1* | 8/2019 | Li ............................ G06N 3/08 |

(Continued)

FOREIGN PATENT DOCUMENTS

| CN | 108288094 A | 7/2018 |
| CN | 108573303 A | 9/2018 |
| EP | 3246875 A2 | 11/2017 |

OTHER PUBLICATIONS

Sutton, Richard S. et al. "Reinforcement learning: An introduction," MIT press, Dec. 2018.

(Continued)

*Primary Examiner* — Vincent H Tran
(74) *Attorney, Agent, or Firm* — Leydig, Voit & Mayer, Ltd.

(57) ABSTRACT

A method for reinforcement machine learning uses a reinforcement learning system that has an environment and an agent. The agent has a policy providing a mapping between states of the environment and actions. The method includes: determining a current state of the environment; determining, using the policy, a current policy output based on the current state; determining, using a knowledge function, a current knowledge function output based on the current state; determining an action based on the current policy output and the current knowledge function output; applying the action to the environment resulting in updating the current state and determining a reward; and updating the policy based on at least one of the current state and the reward.

21 Claims, 6 Drawing Sheets

(56) References Cited

U.S. PATENT DOCUMENTS

| | | | | |
|---|---|---|---|---|
| 2019/0272465 | A1* | 9/2019 | Kimura | G06N 3/0472 |
| 2019/0286979 | A1* | 9/2019 | Harmer | G06N 3/08 |
| 2019/0392924 | A1* | 12/2019 | Bettencourt-Silva | G16H 50/70 |
| 2020/0019842 | A1* | 1/2020 | Kim | G06N 3/0481 |
| 2020/0034705 | A1* | 1/2020 | Pham | G06N 3/0454 |
| 2020/0063676 | A1* | 2/2020 | Neema | G06N 20/00 |
| 2020/0241542 | A1* | 7/2020 | Sung | G06N 3/006 |
| 2021/0057098 | A1* | 2/2021 | Mulligan | G16H 50/20 |
| 2021/0099378 | A1* | 4/2021 | Alaettinoglu | H04L 41/16 |

OTHER PUBLICATIONS

Argerich, Mauricio Fadel et al. "Reinforcement Learning based Orchestration for Elastic Services," IEEE. arXiv:1904.12676v1, Apr. 26, 2019.

Brys, Tim, "Reinforcement Learning with Heuristic Information," Dissertationm Vrije Universiteit Brussel, Dec. 2016.

Su, Pei-Hao et al. „Sample-efficient Actor-Critic Reinforcement Learning with Supervised Data for Dialogue Management, Aug. 12, 2017.

Brys, Tim, "Encoding and Combining Knowledge to Speed up Reinforcement Learning," Proceedings of the Twenty-Fourth International Joint Conference on Artificial Intelligence, Jul. 2015.

Goetschalckx, Robby, "The Use of Domain Knowledge in Reinforcement Learning," Katholieke Universiteit Leuven, Sep. 2009.

Rao, Dattaraj Jagdish, "Leveraging human Domain Knowledge to model an empirical Reward function for a Reinforcement Learning problem," Persistent Systems Ltd., Sep. 16, 2019.

Meuleau, Nicolas et al. "Exploration of Multi-State Environments: Local Measures and Back-Propagation of Uncertainty," Machine Learning 35, 117-154, May 1999.

* cited by examiner

WEAKLY SUPERVISED REINFORCEMENT LEARNING

CROSS-REFERENCE TO PRIOR APPLICATIONS

Priority is claimed to U.S. Provisional Patent Application No. 62/935,101, filed Nov. 14, 2019, the entire contents of which is hereby incorporated by reference herein.

FIELD

The present invention relates to a method of and a system for reinforcement machine learning.

STATEMENT REGARDING FUNDING

The project leading to this application has received funding from the European Union's Horizon 2020 research and innovation programme under grant agreement No 779747.

BACKGROUND

In Reinforcement Learning (RL), an agent learns how to control an unknown environment by interacting with it in order to achieve a certain goal. See Sutton et al., "Reinforcement learning: An introduction", MIT press (2018) ("Sutton") (the entirety of which is hereby incorporated by reference herein). To control the environment, the agent can perform a set of actions that may alter the state of this environment. For each action performed, the agent observes the change in the environment's state and a numerical signal, usually called a reward, that indicates if the action performed moved the agent closer or further to the completion of its goal.

Reinforcement Learning has achieved great success in many fields, such as robotics, networking, recommendation systems, and video games (in which RL has even surpassed human performance). See, e.g., Kober et al., "Reinforcement learning in robotics: A survey," The International Journal of Robotics Research 32(11), 1238-1274 (2013); Theocharous et al., "Personalized ad recommendation systems for lifetime value optimization with guarantees," Twenty-Fourth International Joint Conference on Artificial Intelligence (2015); and Mnih et al., "Human-level control through deep reinforcement learning," Nature 518 (2015) ("Mnih"), (the entire contents of each of which are hereby incorporated by reference herein).

For example, in robotics, the agent can be the robot, and the environment can be the robot's position in space and/or the position of an object. The robot can perform actions to move itself or to perform articulations. The object to achieve may be, for example, the goal of reaching a certain location or grabbing the object.

In networking, RL can, for example, be implemented in order to adapt networking schedulers to their current demand. The agent can be the scheduler and the environment can be the network. Network data, such as average user throughput, traffic volume, or cell congestion, can be used as RL states. The traffic can be split into two categories and the scheduler can decide to what rate serve each category.

Also, recently, researchers are applying RL to computer systems tasks, such as database management system configuration (Schaarschmidt et al., "Lift: Reinforcement learning in computer systems by learning from demonstrations," arXiv:1808.07903 (2018), the entire contents of which is hereby incorporated by reference herein) or container orchestration for Big Data systems (see, e.g., Argerich et al., "Reinforcement Learning based Orchestration for Elastic Services", arXiv:1904.12676 (2019) ("Argerich"), which is hereby incorporated by reference herein). For example, in system configuration and management, RL can be used to find the best configuration of systems and general applications, adapting them to the particular scenario in which they need to operate. In the RL framework, the agent can be the system's manager and the system and the environment can be the execution context. The agent can find the best configuration by modifying the configuration parameters (seen as actions). See Argerich.

The present inventors have recognized that the implementation of state of the art RL, regardless of the domain, can exhibit a number of issues that have to be dealt with in customized ways according to each implementation.

A first issue identified by the inventors is that the RL agent's performance is generally low until it acquires enough experience. This means that when the RL process has just started, the agent might take incorrect actions until it can learn from the environment. This is acceptable when the agent can be trained with a simulator. However, in many cases, simulator training is not possible, and even when it is, it involves considerable extra effort. For example, a robot using RL will move poorly and it might even break itself if it starts performing without any knowledge in the real world. Also, a system might be configured incorrectly, and therefore, its performance will not comply with its requirements until the RL configurator learns enough information about the system and its deployment.

A second issue identified by the inventors is that, often times the state space and action space are large, and therefore, it is not easy for the agent to learn what action is correct for each different state. The way in which the agent explores the effect of the set of actions is crucial because it determines how fast it will be able to learn how to control the environment to achieve its goal. In fact, the RL agent's performance is measured in terms of how well it understands the environment and how fast in can acquire this understanding. For instance, in the case of robotics, a slow or incorrect learning causes the robot to operate inefficiently or even not to perform its expected job. In the case of trading, a slow learning might lead to colossal losses in equity.

A third issue identified by the inventors is that, in the RL framework, it is assumed that the set of actions is constant over time and over all states. This is often not true in practice. For example, a trader cannot buy assets if its capital is not equal to or more than the value of the asset, or the system configuration cannot be upgraded if all resources have been maxed out already.

The first two issues are related to the exploration in RL. Common exploration methods can be separated into undirected and directed methods. Directed methods use the agent's history in the environment to influence the actions that the agent will further explore. While undirected methods explore randomly the environment without any consideration on the agents' past actions.

Undirected Exploration methods include Random Exploration and Semi-uniform Distributed Exploration.

The Random Exploration approach generates actions randomly with uniform probability, and might be used when the cost of exploration during learning is not under consideration. For example, if the task to be learned is divided into a learning phase and a performance phase, and the cost during learning is being ignored, then the Random Exploration approach may be applicable.

Semi-uniform Distributed Exploration, is a method that, rather than generating actions randomly with uniform probability, generates actions with a probability distribution that is based on the utility estimates that are currently available to the agent. One such approach selects the action having the highest current utility estimate with some predefined probability Pbest. Each of the other actions is selected with probability 1−Pbest, regardless of its currently utility estimate.

Directed Exploration methods include Counter-Based Exploration, Competence, Model Based Exploration, and Dynamic Programming.

In Counter-Based Exploration, the number of visits to each state is maintained and actions are evaluated using a combination of the exploitation value and an exploration term. Many variations of these techniques exist, including introducing other mechanisms (such as, decay) or considering other aspects (such as, the estimated change in state utility).

In Competence Maps, an auxiliary data structure is maintained to estimate the degree to which the agent believes it has sufficient knowledge to make good decisions in that regions of the environment. This estimate is used for exploring the world by selecting actions that lead to areas with the lowest knowledge.

Model Based Exploration is an extension to interval estimation methods applied to model based RL. The agent attempts to construct a model of how to effectively explore its environment. Essentially, the agent constructs an estimate of how useful improved knowledge of some part of the environment will be to its performance. A hybrid approach can also be implemented, in which the agent begins to explore using a basic interval estimation method, and after learning enough to construct a model, continues operation by using the model-based method.

Dynamic Programming refers to a collection of algorithms that can be used to compute optimal policies given a model (prefect model) of the environment (e.g., as a Markov decision process). Other approaches are closely related to dynamic programming. For example, Sutton describes the DYNA-Q algorithm, which implements model-based Q-Learning. Also, Meuleau and Bourgine, "Exploration of Multi-State Environments: Local Measures and Back-Propagation of Uncertainty," Machine Learning, 35(2):117-154 (1999) (the entire contents of which are hereby incorporated by reference herein), extend these ideas in order to achieve global-scale reasoning about the agent's uncertainty about the environment using the following key concepts: Exploration Bonuses and Back-propagation of Exploration Bonuses. Exploration Bonuses allow for the quantification of uncertainty in the same units as rewards, and make explicit the rationale behind the choice of a non-optimal action. Back-propagation of Exploration Bonuses allows for "intelligent" and complete exploration of the environment using only local measures of uncertainty.

The third issue is related to the available and legal set of actions for an agent in each different environmental state. This problem can be addressed in two different ways using deterministic programming. The first way, is to modify the reward function to assign a negative reward to unavailable or negative actions so the agent will learn to avoid these actions overtime. However, this means the agent will still execute these actions until it acquires enough experience to know it should not use them. Another way is to simply limit the action choice space according to the state. However, the implementation of this approach is highly ad-hoc and is left as a responsibility for the person in charge of implementation.

SUMMARY

An embodiment of the present invention provides a method for reinforcement machine learning that uses a reinforcement learning system that has an environment and an agent. The agent has a policy providing a mapping between states of the environment and actions. The method includes: determining a current state of the environment; determining, using the policy, a current policy output based on the current state; determining, using a knowledge function, a current knowledge function output based on the current state; determining an action based on the current policy output and the current knowledge function output; applying the action to the environment resulting in updating the current state and determining a reward; and updating the policy based on at least one of the current state and the reward.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1:
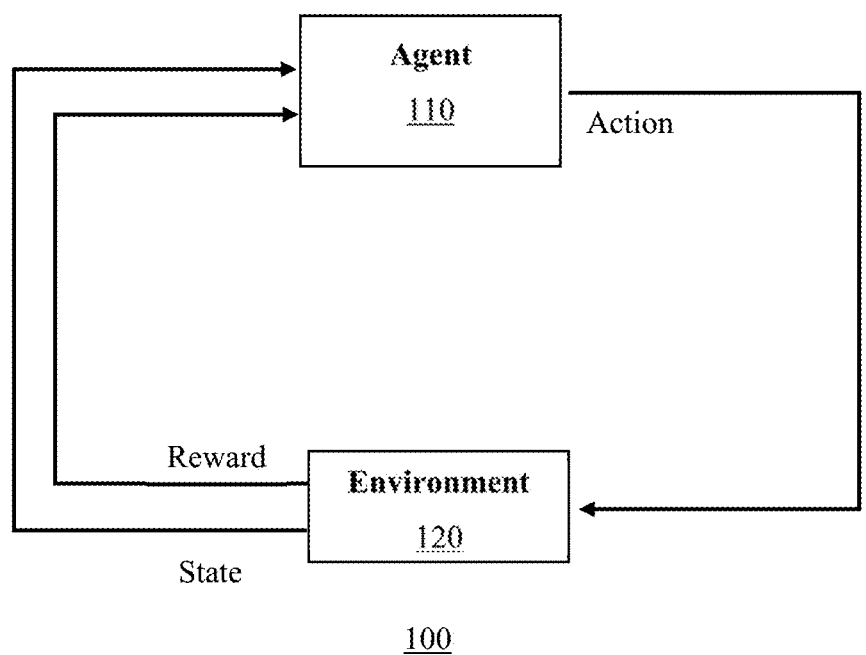
FIG. 1 illustrates an exemplary reinforcement learning system.

Embodiments of the present invention address at least the above-described issues with RL by implementing a new RL scheme, which the inventors have named Weakly Supervised Reinforcement Learning (WSRL). A feature of WSRL is that it takes, as an input, predetermined domain knowledge from the environment in which the agent is deployed (e.g., established heuristics or notions known to domain experts). The domain knowledge is used by the agent to guide constrain its decisions, and to explore the action space, while the agent is also learning (from its own experience) the best actions to achieve its goal in each time step.

Domain knowledge can be provided in the form of programmable functions (knowledge functions). For example, in order to leverage preexisting domain knowledge to constrain and/or guide the RL agent's actions, a human expert may program knowledge functions that encapsulate learned constraints and guidance. Respectively, such knowledge functions can be referred to as constraining functions and guide functions. The WSRL model can then be initialized with these knowledge functions (e.g., the constraining functions and/or guide functions) in order for the RL agent to exploit the domain knowledge in an automated manner.

A "knowledge function", as defined herein, is a computer interpretable (and/or executable) encapsulation of predetermined knowledge of the particular domain in which the reinforcement learning model is deployed (e.g., heuristics, rules of thumb, human-learned knowledge), the knowledge originating external to the reinforcement learning setting (e.g., not being simulated data or prior training data for a model).

Use of the disclosed knowledge functions improves the reliability of RL agents and accelerates their learning. For example, by combining the domain expert's knowledge of constraints and guidelines with a learned policy in an ensemble, embodiments of the present invention improve the reliability of RL agents, provide a reasonable performance of RL in its early stage, and accelerate the RL agents' learning.

Embodiments of the present invention, therefore, provide a mechanism for RL models to learn from already existing knowledge—similar to how a human expert learns from other's past experiences, books, or any other learning material, but in an automatic and efficient manner.

In addition to leveraging domain knowledge, embodiments continue to utilize the agent's policy, particularly as the agent's policy is improved through learning (the learned policy). For example, an embodiment may use an ensemble of the learned policy together with knowledge functions. Such an ensemble may be a linear combination of the learned policy and the knowledge functions. Using an ensemble allows for regulating the importance of each knowledge function in the final decision according to its empirical accuracy, while keeping this ensemble in a white box, whose behavior is clear (as opposed to the behavior of neural networks that are usually seen as black boxes).

An embodiment of the present invention provides a method for reinforcement machine learning that uses a reinforcement learning system that has an environment and an agent. The agent has a policy providing a mapping between states of the environment and actions. The method includes: determining a current state of the environment; determining, using the policy, a current policy output based on the current state; determining, using a knowledge function, a current knowledge function output based on the current state; determining an action based on the current policy output and the current knowledge function output; applying the action to the environment resulting in updating the current state and determining a reward; and updating the policy based on at least one of the current state and the reward.

According to an implementation of the method, prior to first using the knowledge function, the knowledge function, which is a programmable function, is defined to encapsulate external domain knowledge.

According to an embodiment of the method, the knowledge function is a constraining function or a guide function. The constraining function can be a programmable function that has been defined to encapsulate a constraint on a behavior of the agent, the constraining function being configured to take as its input the current state and to return an action mask indicating which of the actions are enabled or disabled. The guide function can be a programmable function that has been defined to encapsulate a predetermined domain heuristic for selecting from among the actions based on the current state, the guide function being configured to take as its input at least one of the current state or the reward and to output an action rating, which rates how good each one of at least a subset of the actions is under current conditions.

According to an embodiment of the method, the reinforcement learning system further includes an ensemble for performing the operation of determining the action. Here, the knowledge function can be one of M+N knowledge functions having M constraining functions and N guide functions, M and N each being an integer. The method may further include: determining, using the constraining functions, M constraining function outputs based on the current state; and determining, using the guide functions, N guide function outputs based on at least one of the current state or the reward. The current knowledge function output can be one of the constraining function outputs or one of the N guide function outputs.

The operation of determining the action can include: combining the guide function outputs to determine an action rating for each of the actions; combining the constraining function outputs to determine an action mask defining which of the actions are enabled and disabled; and determining the action based on the current policy output, the action rating, and the action mask.

Each of the guide functions can have an associated weight. Each of the guide function outputs can be a vector of size L, L being the number of actions. Combining the guide function outputs can include: for each of the guide function outputs, multiplying each entry in the vector by the weight associated with the respective guide function to obtain a weighted guide function output, and multiplying together the weighted guide function output of each of the guide functions to obtain the action rating. The action rating can be a vector of size L that includes a value for each of the actions, a higher value indicating a higher expected performance as compared to a lower value. Each of the constraining function outputs can be a vector of size L, each entry in the vector being a 0 or a 1, where a 0 representing disabled and 1 representing enabled. Combining the constraining functions outputs can include multiplying together each of the constraining function outputs to obtain the action mask in the form of a vector of size L.

The weight of each of the guide functions can be updated based on at least one of the guide function output, the current state, and the reward.

According to an embodiment of the method, the associated weight of each of the guide functions is determined according to:

$$w_{j,t} = \begin{cases} \max(0, w_{j,t-1} + lrr_t) & \text{if } g_j(s_{t-1}, r_{t-1}) = a_{t-1} \\ w_{j,t-1} & \text{otherwise} \end{cases}$$

where:
$w_{j,t}$ is the associated weight of a guide function j, of the guide functions, for a current time step t;
lr is a learning rate;
$r_t$ is the reward in the current time step t;
$s_{t-1}$ is a previous state of the environment in a step t−1;
$g_j(s_{t-1}, r_{t-1})$ is the output of the guide function j for the previous state $s_{t-1}$ and a previous reward $r_{t-1}$ at the step t−1; and
$a_{t-1}$ is a previous action executed in the step t−1.

According to an embodiment of the method, the associated weight of each of the guide functions is determined according to:

$$w_{j,l,t} = \begin{cases} \max(0, w_{j,l,t-1} + lrr_t) & \text{if } g_j(s_{t-1}, r_{t-1}) = a_{t-1} \wedge a_{t-1} = a_l \\ w_{j,l,t-1} & \text{otherwise} \end{cases}$$

where:
- $w_{j,l,t}$ is the associated weight of a guide function j, of the guide functions, given an action l and a current time step t;
- lr is a learning rate;
- $r_t$ is the reward in the current time step t;
- $s_{t-1}$ is a previous state of the environment in a step t−1;
- $g_j(s_{t-1}, r_{t-1})$ is the output of the guide function j for the previous state $s_{t-1}$ and a previous reward $r_{t-1}$ at the step t−1; and
- $a_{t-1}$ is a previous action executed in the step t−1.

According to an implementation of the method, the associated weight of each of the guide functions is determined according to:

$$w_{j,l,s,t} =$$

$$\begin{cases} \max(0, w_{j,l,t-1} + lrr_t) & \text{if } g_j(s_{t-1}, r_{t-1}) = a_{t-1} \wedge a_{t-1} = a_l \wedge s_{t-1} = s_s \\ w_{j,l,t-1} & \text{otherwise} \end{cases}$$

where:
- $w_{j,l,s,t}$ is the associated weight for a guide function j, of the guide functions, given an action l, the current state s, and a current time step t;
- lr is a learning rate;
- $r_t$ is the reward in the current time step t;
- $s_{t-1}$ is a previous state of the environment in a step t−1;
- $g_j(s_{t-1}, r_{t-1})$ is the output of the guide function j for the previous state $s_{t-1}$ and a previous reward $r_{t-1}$ at the step t−1; and
- $a_{t-1}$ is a previous action executed in the step t−1.

The ensemble may determine the action according to:

$$y_t = \left( \omega \frac{\sum_j^N w_{j,t} g_j(s_t, r_t)}{\max \sum_j^N w_{j,t} g_j(s_t, r_t)} + (1-\omega) \frac{\pi(a_0, a_1, \ldots, a_l \mid s_t)}{\max \pi(a_0, a_1, \ldots, a_l \mid s_t)} \right) \cdot \prod_i^M f_i(s_t)$$

and according to:

$$a_{t+1} = \max_a y_t$$

where:
- $w_{j,t}$ is the associated weight of a guide function j, of the guide functions, for a current time step t;
- lr is a learning rate;
- $s_t$ is the current state at the current time step t;
- $r_t$ is the reward in step t;
- $g_j(s_t, r_t)$ is the output of the guide function j given $s_t$ and $r_t$; and
- ω is a that defines an importance of the guide functions with respect to the policy;
- $\pi(a_0, a_1, \ldots, a_l \mid s_t)$ is a value yielded for each of the actions by the policy given the current state $s_t$;
- $\max \sum_j^N w_j^t g_j(s_t)$ selects a maximum value in a vector composed of the weighted outputs of each of the guide functions;
- $\max \pi(a_0, a_1, \ldots, a_l \mid s_t)$ selects a maximum yield value for the policy given the current state $s_t$;
- $\prod_i^M f_i(s_t)$ represents an element wise product of all of the constraining functions;

$$\max_a y_t$$

represents selecting an action having the maximum value from the vector $y_t$; and
- $a_{t+1}$ represents the action that is determined by the ensemble.

In an embodiment, the parameter w is 1 in a first step at t=0 and decreases to 0 as steps increase.

According to an embodiment of the method, the method further includes performing at least one of removing the knowledge function or adding an additional knowledge function during runtime.

According to an embodiment of the present invention, a system is provided that includes one or more processors which alone or in combination, are configured to provide for execution of a method for reinforcement machine learning using a reinforcement learning system. The reinforcement learning system includes an environment and an agent, the agent having a policy providing a mapping between states of the environment and actions. The method includes: determining a current state of the environment; determining, using the policy, a current policy output based on the current state; determining, using a knowledge function, a current knowledge function output based on the current state; determining an action based on the current policy output and the current knowledge function output; applying the action to the environment resulting in updating the current state and determining a reward; and updating the policy based on at least one of the current state and the reward.

Accordingly, WSRL (as disclosed herein) improves RL by creating a mechanism to leverage predetermined domain knowledge (e.g., external knowledge and expertise of the domain), thereby enhancing performance in an RL model's early steps, making the RL model more reliable (e.g., in terms of what the agent will learn), and accelerating the learning procedure.

Also, expressing external domain knowledge through programmable functions of various types (e.g., according to the type of knowledge) makes the disclosed embodiments more flexible and straightforward than other RL approaches. Flexibility is further enhanced in embodiments that include the ability to introduce or remove knowledge functions during runtime.

Additionally, the introduction of knowledge functions (e.g., constraining and guide functions) to the RL framework allows for the definition of changing action spaces in RL and the insertion of guides to the learning process of the RL agent.

The combination of knowledge functions (e.g., constraining and guide functions) with RL policies in a transparent and clear model also allows for the agent to learn the implicit accuracy of the domain knowledge (e.g., the guidance) and to prioritize (empirically) the use of the agent's own policy when significant experience has been acquired by the agent.

Still further, the modelling of external knowledge (e.g., human expertise) into knowledge functions (e.g., constraining and guide functions), and the combination (e.g., in an ensemble) of the knowledge functions with the agent's policy for the RL framework (e.g., a policy that also considers learning the implicit accuracy of guide functions) improves the exploration and performance of RL.

In all, it is therefore apparent that embodiments of the present invention provide improved systems and methods over state of the art reinforcement learning system and methods. Indeed, embodiments of the present invention can be used to improve the performance of RL (e.g., improve the learning time of the agent) in real-world use cases, such as: robotics, networking, and system configuration and management.

For example, in robotics, because each trial-and-error involves physical movement of the parts of the robot, some actions might cause damage to the robot if not properly constrained for some cases (e.g., in which the position of the robot parts or the position of the robot in its environment might be dangerous). In addition, by already giving some heuristics about how to move in different situations, the robot will begin its functioning with a better performance than in the usual setting of RL, and the robot will also learn faster the correct actions it should take to achieve its goal.

In networking, networking algorithms (e.g., load balancers or routing algorithms) already exist, and also operators have domain knowledge about "rule of thumbs" (heuristic data) about what should be done in certain scenarios. These two inputs can be used to guide our model (e.g., used as guide functions) in order to improve the networking traffic from the start. By utilizing this knowledge, the RL agent can start with a default performance based on a previous algorithm, and by using its own experience, the RL agent can improve upon the previous algorithm, reaching a higher performance faster than in the standard setting of RL.

In system configuration and management, it is particularly important that the system's configuration is "good enough" from the start, otherwise, the application deployed will not be able to perform as expected. It is also a special case because, in most cases, the real system (with its real load, data, deployment, etc.) is not available for tests or simulations. It is not then possible (or at least practical) to train the RL agent in advance. However, the system's developer usually has some heuristics (e.g., about how to start or what to do in cases in which the application needs support), and so the systems' developer can input this knowledge as guidelines for the agent's behavior since the beginning. Also, the implementation of Fault, Detection, Isolation and Recovery (FDIR) mechanisms can be introduced as constraints for the RL agent's behavior, improving the system's reliability.

The embodiments disclosed herein can also be applied in the fields of automatic configuration of systems in which there are a great number of configurable parameters and the correct values for each highly depend on the system use, such as Spark, DBMS, and cloud environments. For example, embodiments include the introduction of WSRL to orchestrate the deployment of applications to FogFlow, finding the best deployment plan for each different on-demand service.

Embodiments also relate to reinforcement learning exploration, reinforcement learning warm start, reinforcement learning preloading, heuristics-based control, and reinforcement learning with changing action space.

In an embodiment of the present invention, a WSLR model is deployed by modifying and existing RL model such that it can incorporate and exploit knowledge functions. The knowledge functions are configured to encapsulate domain knowledge of constrains and guides for the RL agent to use while learning and interacting with the environment. The knowledge functions incorporated into the RL model therefore can include constraining functions and/or guide functions.

Constraining functions are programmable functions that constrain the behavior of the agent. Each constraining function $f_i(\bullet)$ takes, as its input, the state of the environment at time step t, and returns a vector of size L (where L is the number of actions available to the agent) in which there is a 1 or 0 for each action. A value of 1 represents that the action is enabled, while a value of 0 represents that the action is disabled and cannot be performed for this state and reward. Constraining functions are useful in cases when the actions of the agents are constrained because of the current state.

To illustrate the concept of a constraining function, consider, for example an implementation where, when configuring the deployment of a system, the agent can add and remove replicas to the deployment; however, there may be a maximum number of replicas available in which the add action should be disabled. In such a scenario, a constraining function may be defined as the following:

```
def scale_parallel_processing_constraint(state):
    if state.replicas >= 48:
        return [1, 1, 0, 1]
    elif state.replicas <= 1:
        return [1, 1, 1, 0]
    else:
        return [1, 1, 1, 1]
```

In this example, the constraining function disables the action of adding a replica (represented by the third element in the action vector) when the number of replicas is greater or equal to 48. In addition, if the number of replicas is 1, the action to remove a replica is disabled (represented by the fourth element in the action vector). In any other cases, no actions are disabled, so the vector returned is full of 1s.

Guide functions are also programmable knowledge functions and express guidelines for the agent's behavior. These functions take, as input, the current RL state and reward, and output a vector of size L, assigning a value that represents how "good" is each action. Or more generally, a guide function outputs an action rating which rates (at least a subset of) the actions in the action spaced based on how "good" the action is. The values that a guide function outputs can be interpreted as the expected reward after performing each action, (e.g., similar to the values that the agent's policy outputs). In the end, the best action is the action with the highest value.

The guide functions can enable implementation of changing action spaces in RL, as well as introduce guides to the behavior of the RL agent. The guide functions can be used, for example, to guide the agent's behavior when the agent lacks sufficient experience to take an action that is likely to achieve its goal (e.g., produce a positive—if possible, high—reward).

At least some guide functions inherently depend on making assumptions on the environment in which RL will be used. This can add some bias to the learning of the RL agent (e.g., in order to reduce its variance), especially at the start of the learning process. As a consequence, if a guide function provides poor guidelines to the agent (e.g., the predetermined domain knowledge is incorrect or non-ideal), then the learning might take longer than in model-free RL. Yet even in this worst-case scenario, in the long run, the agent's learning should converge to the same results as model-free RL. That is, even if a guide function provides poor guidance, the agent learns over time that the accuracy of this guide function is low, and can lower the guide function's impact on the decision as to what action to use in each time step.

Below is an example of a guide function that checks the current CPU usage and the latency of the system, and if both of these metrics are high, adds a replica (marked by action number 3 in the vector).

```
def scale_parallel_processing(state, reward):
    if state.cpu_usage > 0.8 and state.latency > 0.9:
        return [0, 0, 1, 0]
    else:
        return [0, 0, 0, 0]
```

As shown above, the guide function can also return a vector of 0s. In this case, the defined guide function has no guide for this situation.

FIG. 1 illustrates an RL system 100. As shown, the agent 110 interacts with the environment 120 in discrete time steps t=0, 1, . . . . In each step, the agent 110 receives a representation $s_t \in S$ of the state of environment and a numerical signal $r_t$ called a reward, and performs an action $a_t \in A$ that leads to the next state $s_t+1$ and a new reward $r_t+1$, perceived by the agent 110 in the next time step. As used herein, S and A represent the sets of states and actions, respectively.

The behavior of the agent 110 is defined by its policy π, which provides a mapping from states S to actions A. The value function $q_\pi(s, a)$ represents the expected future reward received when taking the action a at the state s with a policy π. The goal of the agent 110 is to find a policy that maximizes a cumulative reward in the long run so that the value function can be used to determine the selected action for each state.

To do this, the agent 110 learns from its experience for each performed action $a_t$, and then uses the collected observations $(s_t+1, r_t+1)$ to optimize its policy π based on different models of the value function, such as a Tabular model (see Sutton) or a deep neural network model (see Mnih). Existing studies show that RL can lead to a reasonable model for determining which action to take in each state after learning from a large number of experience data. However, there is a problem with how to get the RL agent 110 to learn from its experience data fast and efficiently.

There have been different approaches of addressing this problem in the state of the art. A simple approach is to explore the state space randomly, but this approach is usually time-consuming and costly (particularly when the state and/or action space is large). A drawback of the random exploration approach has also been reported by a previous study in a case of leveraging RL to automatically decide the configuration and deployment actions of a data processing pipeline in a cloud and edge environment. See Argerich.

Another approach to address the above problem is to gain experience using a simulation. With enough computational resources, simulations can be capable of producing significant experience data in a short time, but it is difficult to ensure that the simulated experiences are realistic enough to reflect the actual situations in the observed system.

Historical data (of a model) has also been used to improve the exploration efficiency. For example, pre-trained models and pre-trained policies have been used to bootstrap the exploration phase of a RL agent. See, e.g., Moreno et al., "Using prior knowledge to improve reinforcement learning in mobile robotics," Proc. Towards Autonomous Robotics Systems (2004); and Hester et al, "Deep q-learning from demonstrations," Thirty-Second AAAI Conference on Artificial Intelligence (2018) (the entire contents of each of which are hereby incorporated by reference herein). However, this type of historical data originates only in previous RL training, which means that it is undesirably limited by the availability of such data.

In contrast to relying on simulation data and/or any pre-trained model, embodiments of the present invention use a set of programmable knowledge functions to guide the exploration of a RL agent. This enables quickly bootstrapping a RL agent to make effective decisions, even after just a few exploration steps. Particularly for deployment scenarios where historical data for training is not available and building a simulator is impractical, the approach of embodiments of the present invention improves the initial performance of reinforcement agents.

Figure 2:
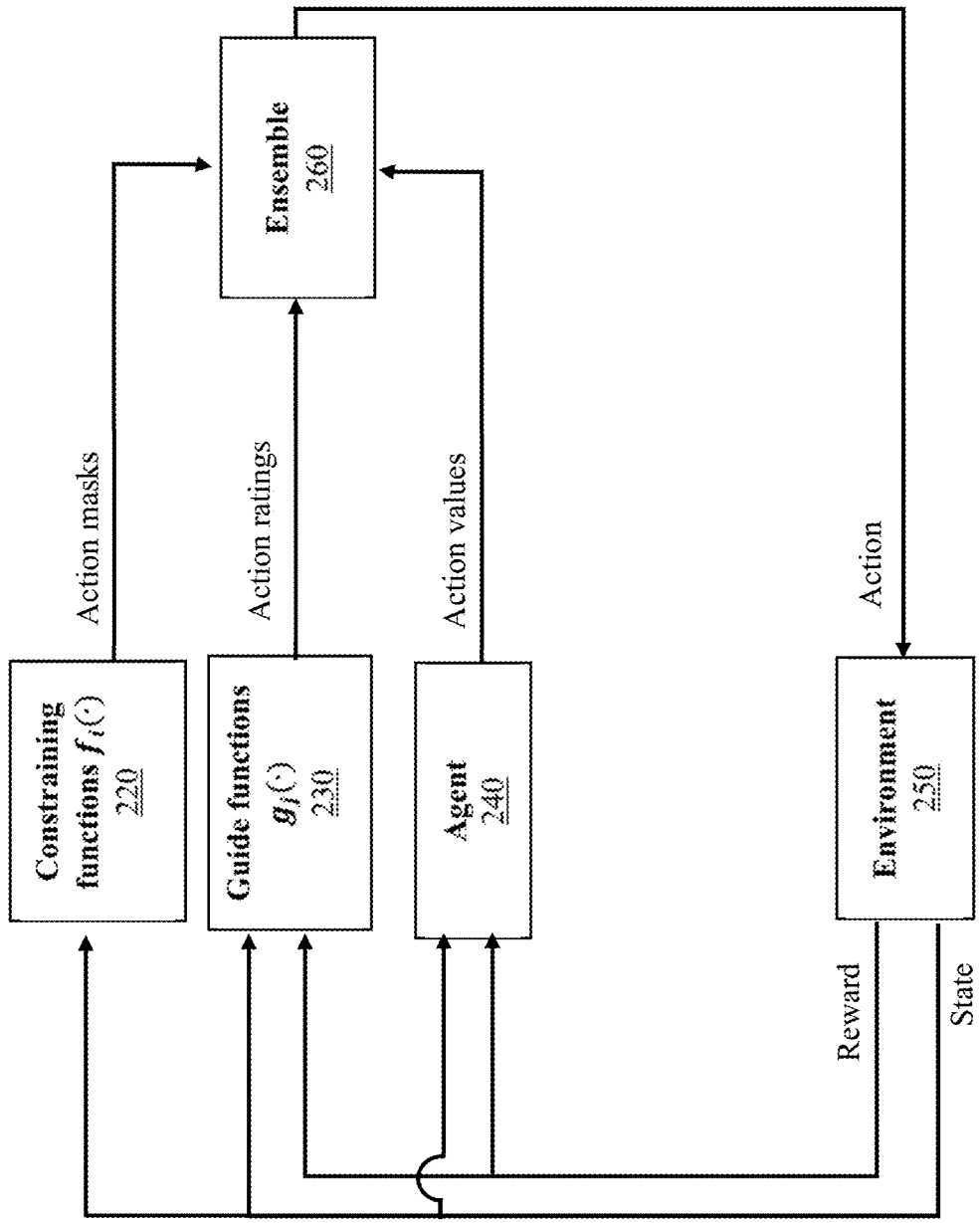
FIG. 2 illustrates an exemplary weakly supervised reinforcement learning system according to an embodiment.

FIG. 2 illustrates and exemplary embodiment of a RL system employing WSRL. The RL system 200 includes an ensemble 210 for combining constraining functions 220, guide functions 230, and a policy of an agent 240.

At the outset, the RL system 200 can be initialized by building the problem to be solved into the framework of the RL system 200. This is done by defining elements of the RL system 200, including defining the agent 240 (including its policy), environment 250, action space, state space, and rewards of the RL system 200. The basic framework (i.e., the basic RL system excluding the knowledge function implementation) may be determined by various means, including those currently known in the state of the art for RL.

Knowledge functions are also defined for the particular problem and domain. According to the embodiment of FIG. 2, the knowledge functions include constraining functions 220 and guide functions 230. However, embodiments of the present invention are no so limited, for example other embodiments may implement only guide functions or only constraining functions, while still further embodiments may implement other types of knowledge functions that program aspects of a domain expert's knowledge.

The constraining functions 220 are programmable knowledge functions that constrain the behavior of the agent 240. Each constraining function $f_i(•)$ takes as its input the state of the environment 250 at time step t, and outputs an action mask disabling actions in the action space which cannot be performed for the present state. The action mask may be in the form of a vector with an entry for each action in the action space, where the value of each entry is either a 1 or 0. Here, the value 1 represents that the corresponding action is enabled, while a value 0 represents the corresponding action is disabled (i.e., cannot be performed for this state). In this way, the action space effectively changes according to the state of the environment (at least, from the view of the agent).

Thus, by using the constraining functions, pre-determined knowledge (e.g., from a domain expert) about the state-dependent action space for a domain can be programed into the RL system 200. According to one embodiment, each constraining function is defined by creating an action mask (e.g., in the form of a vector of the actions, each with an enabled/disabled indication) for a particular state where it is known that certain actions are impossible or otherwise ineffective. Once defined, the constraining functions can then impart the expert knowledge to the RL agent in an automated and efficient manner. Through this mechanism, therefore, the RL agent is able to bootstrap the domain expert's knowledge of the action space into its own decisions making, improving the RL model's performance.

Guide functions 230, in comparison, are programmable knowledge functions that express domain heuristics, which the agent 240 can use to guide its decisions, especially in moments of high uncertainty (e.g., at the start of the learning process). These functions take as their input the current RL state, and output a vector that represents how "good" is each action. In addition to the current RL state, guide functions 230 may also take the current reward as an input.

By using the guide functions, pre-determined knowledge (e.g., from a domain expert) about known good or effective actions (or known poor or ineffective actions) under certain conditions can be programed into the RL system 200. According to one embodiment, each guide function is defined by creating an action score card (e.g., in the form a vector of the actions with corresponding weights) for a particular state where it is known that certain actions are more or less favorable than others. Once defined, the guide functions can then impart the expert knowledge to the RL agent in an automated and efficient manner.

After the RL system 200 has been initialized (e.g., by defining the constraining functions 220, guide functions 230, and agent 240, environment 250, state space, action space, and rewards), the RL system 200 may then be placed into operation.

In operation, the agent 240 observes the state of the environment 250. The state is passed to M constraining functions 220 and N guide functions 230 to obtain M+N vectors, each of size L (where M is the number of constraining functions, N is the number of guide functions, and L is the number of actions in the action space).

The agent 240 may also observe the reward from the previous action on the environment 250. The reward may be passed to the guide functions 230 (e.g., in addition to the state) to determine the output vector.

The state and reward are also observed by the policy that the agent 240 maintains. Using the policy, the agent 240 outputs a vector of size L valuing each action. When the agent 240 first starts functioning, it has no knowledge of its own from the environment 250 because it has no experience (i.e. no actions have been taken yet by the agent 240; and therefore, the output of the policy of the agent 240 might be random).

In the embodiment of FIG. 2, the M vectors from the constraining functions 220, the N vectors from the guide functions 230, and the vector from the agent 240 are sent to an ensemble 260.

At the ensemble 260, the N vectors output from the guide functions 230 are combined in a weighted manner. Here, a weight can be assigned per guide function. In an embodiment, the weight may be set to 1 initially for all guide functions. This weighted combination of the N vectors of the guide functions 230, results in a consolidated guide vector with a value for each action in the action space. In the consolidated guide vector, the higher the value indicates that better results are expected by performing the associated action.

The ensemble 260 may then multiply (element-wise) the consolidated guide vector ("action rating") with each of the M vectors ("action masks") generated by the constraining functions 220. In another embodiment, the M vectors may first be combined into a consolidated action mask by multiplying (element-wise) the M vectors together. The consolidated action mask may then be multiplied with the consolidated guide vector to produce the knowledge vector. In another embodiment, the ensemble 260 may first combine (including combine by weight) the consolidated guide vector with the output of the agent's policy prior to applying the action masks.

According to an embodiment, the action with the highest value is chosen and performed by the agent 240. After the action is chosen and performed, the environment 250 reacts to the action, including possibly changing its state and giving a reward to the agent 240.

The agent 240 then updates its policy (e.g., q-table, deep RL, model-based, etc.). The agent 240 may then also update the weights of each guide function 220 (e.g., according to their previous output), and updates the current state of the environment 250 and the reward received.

The RL system 200 will then repeat its operations, starting with sending the state (with or without the reward) to the constraining functions 220 and guide functions 230 (e.g., because the RL system 200 has already been appropriately initialized and the knowledge functions defined).

In a further refinement of an embodiment of the present invention, a weight per function may be defined in order to increase or decrease the importance in the final ensemble of each guide function (e.g., the weight function may be adjusting according to a reward received.). This operation may be implemented at the ensemble (e.g., the ensemble 260 of FIG. 2).

According to an embodiment, initially, all weights are set to 1. Subsequently, in every step the weights are updated, for example by the following Equation 1:

$$w_{j,t} = \begin{cases} \max(0, w_{j,t-1} + lr r_t) & \text{if } g_j(s_{t-1}, r_{t-1}) = a_{t-1} \\ w_{j,t-1} & \text{otherwise} \end{cases} \quad (EQ1)$$

In the preceding equation:
a. $w_{j,t}$ is the weight of guide function j for current time step t;
b. lr is the learning rate;
c. $r_t$ is the reward in step t;
d. $s_{t-1}$ is the state of the environment in step t−1;
e. $g_j(s_{t-1})$ is the output of guide function $g_j(\bullet)$ for $s_{t-1}$; and
f. $a_{t-1}$ is the action executed in step t−1.

The ensemble is calculated as a product between the constraining functions' output and the normalized weighted sum of the outputs of the guide functions added to the q values for each action outputted by the policy. This may be implemented according to Equation 2, as follows:

$$y_t = \left( \omega \frac{\sum_j^N w_{j,t} g_j(s_t, r_t)}{\max \sum_j^N w_{j,t} g_j(s_t, r_t)} + (1-\omega) \frac{\pi(a_0, a_1, \ldots, a_l | s_t)}{\max \pi(a_0, a_1, \ldots, a_l | s_t)} \right) \cdot \prod_i^M f_i(s_t) \quad (EQ2)$$

In the preceding equation:
a. ω is a parameter of the model (0,1) that defines the importance of the guide functions with respect to the agent's learned policy;
b. $\pi(a_0, a_1, \ldots, a_l | s_t)$ is the value yielded for each action by the agent's policy given $s_t$;
c. max $\Sigma_j^n w_j^t g_j(s_t)$ selects the maximum value in the vector, in order to normalize its values;

d. max π(a₀, a₁, . . . , a₁|s₁) same as above; and
e. $\Pi_i^M f_i(s_t)$ represents the element wise product of all constraining functions.
f. $y_t$ is a vector with an entry for each of the possible actions Finally, the action chosen for next time step is selected as the action with the highest value in the ensemble. This may be implemented according to Equation 3, as follows:

$$a_{t+1} = \max_a y_t \quad (EQ3)$$

Embodiments of the present invention also allow for the introduction of new guide functions or constraining functions during runtime (as well as their removal).

In case a new constraining function is added, it is added to the product of constraining functions. In the case of a new guide function, this new guide function is added to the first member of the ensemble. Also the new guide function may be assigned an initial weight of 1. This weight is then update in each iteration according to the empirical accuracy of the guide function.

For removal of a constraining function or guide function, the function (with its weight as applicable) is removed from the ensemble.

Embodiments of the present invention are not strictly limited to the above discussed implementation. That is variations are contemplated within the invention's scope.

For example in one variation, the equation to calculate the ensemble includes the weight ω that determines the importance of the guide functions against the learned policy. In Equation 2 (discussed above) this is constant over time. However, in another embodiment, the importance of the guide functions can be lowered over time (e.g., as the agent acquires more experience and the agent's policy is improved). In order to do this, embodiments may, for example, apply Equation 4, as indicated below:

$$y_t = \left( \omega^t \frac{\sum_j^N w_{j,t} g_j(s_t, r_t)}{\max \sum_j^N w_{j,t} g_j(s_t, r_t)} + (1-\omega^t) \frac{\pi(a_0, a_1, \ldots, a_l \mid s_t)}{\max \pi(a_0, a_1, \ldots, a_l \mid s_t)} \right) \cdot \prod_i^M f_i(s_t) \quad (EQ4)$$

When implementing the above embodiment, in the first step t=0, when the agent has no experience, $\omega^0=1$ so that the decision depends solely on the outputs of the guide functions and not the value of the agent's policy (this is not to the exclusion of the constraining functions, which are always considered). Because the value of ω is in the interval (0,1), as $t \to \infty \therefore \omega^t \to 0$, decreasing the importance of the guide function as the agent learns.

In another variation, a weight can be used per action and function, updating the weight with Equation 5, as follows:

$$w_{j,l,t} = \begin{cases} \max(0, w_{j,l,t-1} + lrr_t) & \text{if } g_j(s_{t-1}, r_{t-1}) = a_{t-1} \wedge a_{t-1} = a_l \\ w_{j,l,t-1} & \text{otherwise} \end{cases} \quad (EQ 5)$$

According to the preceding Equation 5, $w_{j,l,t}$ is the weight for guide function j, action l, and time step t. The symbol ^ represents the logical operator AND.

In another variation, a weight might be used per state, action, and function (e.g., when the state space is discrete). The weights are updated by following Equation 6:

$$w_{j,l,s,t} = \begin{cases} \max(0, w_{j,l,t-1} + lrr_t) & \text{if } g_j(s_{t-1}, r_{t-1}) = a_{t-1} \wedge a_{t-1} = a_l \wedge s_{t-1} = s_s \\ w_{j,l,t-1} & \text{otherwise} \end{cases} \quad (EQ 6)$$

According to the preceding formula, $w_{j,l,s,t}$ is the weight for guide function j, action l, state s, and time step t.

Figure 3:
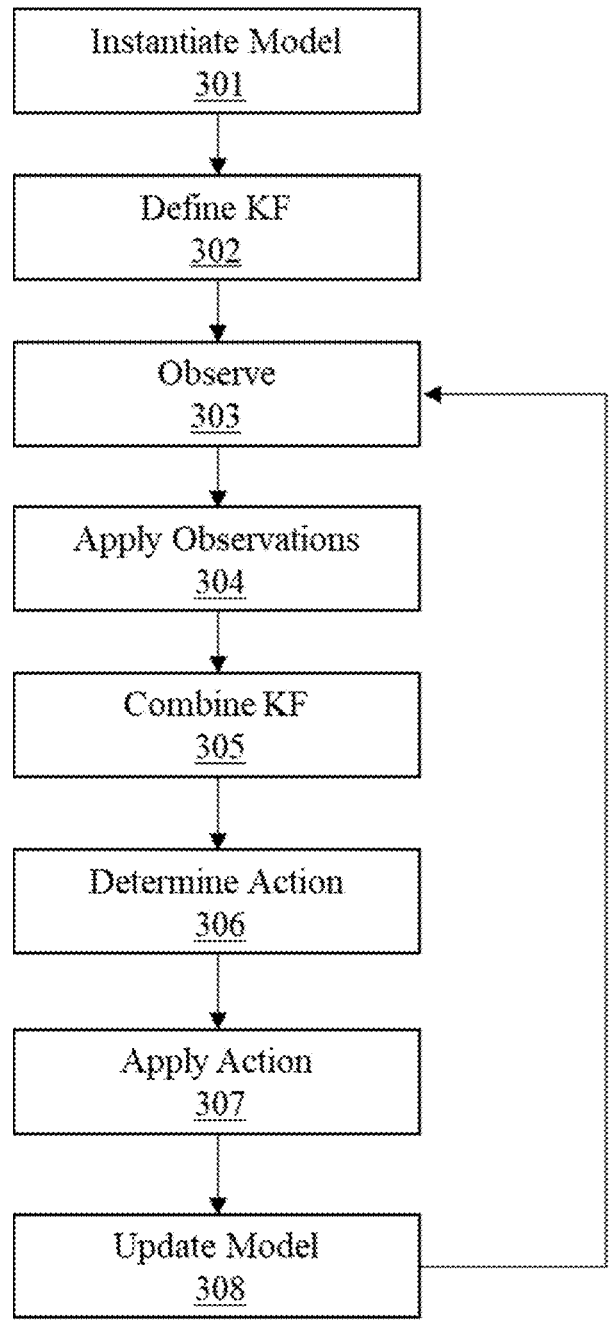
FIG. 3 illustrates a method for operating a reinforcement learning system according to an embodiment.

FIG. 3 illustrates a method for operating an RL system (e.g., the RL system 200) according to an embodiment of the present invention. The method 300 is configured to implement the combination of domain knowledge (e.g., constraints and guides) and empirical knowledge for the optimization of reinforcement learning. The method can include the following operations.

At the outset, an RL model for the RL system is instantiated (Operation 301). The model can be instantiated by configuring and initializing a model according to the relevant domain. Instantiation can, therefore, include defining (or selecting) an agent, a policy, a state space, an action space, and rewards.

For embodiments of the present invention, the model is instantiated such that it can incorporate knowledge functions (KF). Accordingly, prior to operating the system, the knowledge functions can be defined (Operation 302). Defining the knowledge functions can include defining constraining functions and defining guide functions based on domain expertise.

Once the model is instantiated and the knowledge functions are initialized, the RL system can begin operation. Beginning operation includes observing (e.g., by the agent 240) the conditions of the environment (e.g., environment 250) (Operation 303). Observing the conditions of the environment allows for determining at least one of a state and a reward.

After observing the environment, the model applies those observations (Operation 304). Applying the observations can include the agent using its policy to determine its output based on the observed state (with or without the observed reward). As described herein, the output of the agent's policy can include a selection of an action predicted to obtain the highest reward. Applying the observations can also include feeding the observed current state (with or without the observed current reward) to the knowledge functions. Like the agent, the knowledge functions determine their outputs based on the observed state (with or without the observed reward). As described herein, when the knowledge function is a constraining function, an action mask may be generated as its output, and when the knowledge function is a guide function, an action rating may be generated as its output.

After the outputs of the knowledge functions are determined, these outputs may be combined (Operation 305). As explained herein, the knowledge functions may first be combined according to type. For example, the action ratings output of the guide functions may be combined to create a combined action rating. This combination may include applying a per-guide function weight to each of the action ratings before combining. The action masks of the constraining functions may also be combined to create a combined action mask.

An action can then be determined based on the knowledge functions' combined outputs (e.g., a combined action rating and combined action mask) and the output of the agent's policy (Operation 306). Furthermore, in some embodiments, the combination of at least a portion of the knowledge functions' combined outputs (e.g., the combined action mask) may be combined with the output of the agent's policy in a weighted manner, where the weight changes over time. For example, at the initial phase, the weight may strongly (or exclusively) favor the combined action rating over the output of the agent's policy, but at a later stage, may strongly (or exclusively) favor the output of the agent's policy over the combined action rating. Regardless of the method of combining the outputs of the agent's policy and the knowledge functions, in embodiments, the action with the highest value is chosen.

After choosing the action, the action is performed by the agent on the environment (Operation 307). This results in an updated state and an updated reward.

Before performing the next action selection, the model is updated (Operation 308). This can include the agent updating its policy and updating the weights for the knowledge functions according to, for example, the previous output, the current state of the environment, and the reward received. Updating the model can also include adding or removing knowledge functions during runtime.

The RL system can then continue with a next step of its operation by once again observing the state of the environment (Operation 303), and continuing as outlined above.

Figure 4:
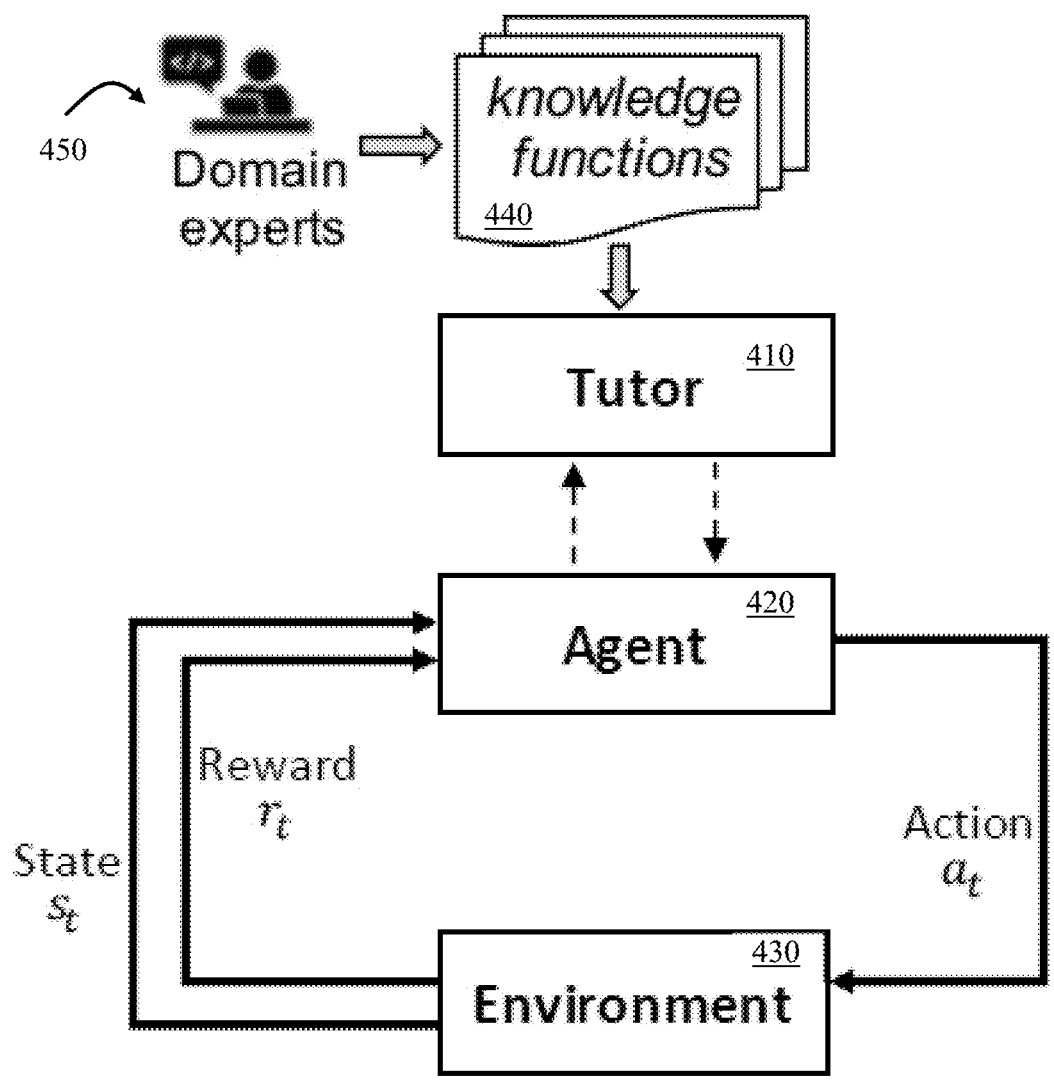
FIG. 4 illustrates an example implementation of a reinforcement learning system according to an embodiment of the present invention.

FIG. 4 illustrates a diagram of Tutor4RL, which is a particular implementation of an RL system according to an embodiment of the present invention. Unlike known approaches, Tutor4RL requires no previous training. Therefore, it is a more practical approach for the use of RF in real systems.

As compared to a traditional RL system, the Tutor4RL system 400 includes a new component, tutor 410. Tutor 410 guides the agent 420 to make informed decisions during training. The tutor 410 is able to guide the agent 420 because the tutor 410 can directly leverage a set of knowledge functions 440 defined by domain experts 450. In this way, the tutor 410 can help the agent 420 avoid blind decision at the outset.

The tutor 410 possesses external knowledge and interacts with the agent 420 during training. The tutor 410 takes as an input the state s of the environment 430 and outputs the action a to take, in a similar way to the agent's policy. In the embodiment shown in FIG. 4, the tutor 410 is passed the state s (and potentially the reward r) by the agent 420. The tutor is also shown as sending its output (i.e., the choses action a) to the agent 420.

As an example, consider a scenario where a TutorRL system 400 has as its environment 430 the video game Atari Breakout. Here, the tutor 410 takes a frame from the video game as an input (i.e., the current frame is the current state $s_t$) and outputs a suggested direction that the bar should be moved (i.e., the direction is the next action $a_t+1$). Thus, for every time step t, the tutor 410 interacts with the agent 420 and then gives advice to the agent 420 for making better decisions based on all provided knowledge functions. By using the tutor 410, the agent 420 is able to perform its function in a reliable way from the start and to achieve higher performance in a shorter training time.

Another aspect of the TutorRL system 400, is that as agent 420 gathers more experience, it learns its policy and can leave the tutor 420 behind, improving on their results as a result of the agent's learned empirical knowledge. Thus, one issue for the agent 420 to consider is when and how often it should ask for advice from the tutor 410. This may be addressed by defining a threshold parameter τ for the agent to control when it will take the suggested actions from the tutor 410 instead of using its own decision. The appropriate value to initiate the threshold parameter τ is it depends on the use case and is left to be decided during implementation.

The tutor 410 is implemented using programmable functions, in which external knowledge is used to decide the mapping between states s and actions a. These programmable functions have been referred to as knowledge functions herein.

Knowledge functions are capable of being programed by domain experts, and allow the domain experts to easily import different types of domain knowledge into the tutor 410. The Tutor4RL system 410 considers two types of knowledge functions: constrain functions and guide functions.

The constrain functions, implemented via the tutor 410, are programmable functions that constrain the behavior of the agent 420. At each time step t, a constrain function takes the state s of the environment 430 as and input, and then returns a vector to indicate whether an action $a_i$ in the action space A could be taken or not using the value 1 or 0 (1 representing the action is enabled, and 0 representing the action is disabled and cannot be performed for this state s). Thus, the tutor 410 can implement constrain functions to provide a mask for avoiding unnecessary actions for certain states.

The guide functions, implemented via the tutor 410, are programmable functions that express domain heuristics that the agent 420 can use to guide its decisions (especially in moments of high uncertainty, e.g. start of the learning process). Each guide function takes the current state $s_t$ and reward $r_t$ as inputs, and then outputs a vector to represent the weight of each preferred action according to the encoded domain heuristics.

Benefits advanced by the Tutor4RL system 400 include the following. First, during training, the tutor 410 enables a reasonable performance by the agent 420 (as compared to an unreliable performance from an inexperienced agent), while generating experience for training. Furthermore, the experience generated by the tutor is important because it provides examples of good behavior. Second, the knowledge of the tutor 410 does not need to be perfect or extensive. The tutor 410 might have partial knowledge about the environment 430 (e.g., know what to do in certain cases only), or might not have a perfectly accurate knowledge. The tutor 410 provides some "rules of thumb" that the agent 420 can follow during training, and based on experience, the agent 420 can improve upon these decisions, achieving a higher reward than the tutor 410 (in the long run).

Results have shown that an implementation of the Tutor4R embodiment (which uses external knowledge) can achieve a three times higher reward than a traditional agent (that did not use external knowledge) in its initial stage.

An embodiment of Tutor4RL was implemented by modifying the Deep Q-Networks (DQN) agent (see Mnih), using the library Keras-RL (see Plappert et al, keras-rl (2016) available at github.com, the entire contents of which is hereby incorporated by reference herein) along with Tensorflow. In order to make the evaluation reproducible, a well-known workload for RL was chosen, namely playing Atari games. In particular, the Atari game Breakout was selected, and the environment used was BreakoutDeterministic-v4 from OpenAI Gym (Brockman, Openai gym, aXiv: 1606.01540 (2016), the entire contents of which is hereby incorporated by reference herein). The Tutor4RL implementation was compared to a standard DQN agent (as implemented by Keras-RL). The same set of parameters were used for both the DQN agent with tutoring and the one without. The parameters use for the agents are detailed in Table 1.

TABLE 1

Parameters used in evaluation:

| Parameter | DQN | DQN + Tutoring |
|---|---|---|
| Policy | Epsilon greedy | |
| Epsilon | [0.3-0.1] decreasing linearly through 0 to 1.75M steps | |
| Gamma | 0.99 | |
| Warmup Steps | 50000 | |
| Optimizer | Adam with lr = 0.00025 | |
| Tau | — | [1-0] decreasing linearly through 0 to 1.5M |

In the BreakoutDeterministic-v4 environment, the observation is a RGB image of the screen, which is an array of shape (210, 160, 3), and four actions are available: (1) no operation; (2) fire (starts the game by "throwing the ball"); (3) right; and (4) left. Each action is repeatedly performed for a duration of k=4 frames. In order to simplify the state space of the agent, each frame is pre-processed by converting it to greyscale and reducing its resolution to (105, 105, 1).

The guide function implemented takes as an input the pre-processed frame, locates the position of the ball and the bar in the X-axis, and returns "fire" if no ball is found or the action to move in direction of the ball if it is not above the bar. The pseudocode for this guide function can be seen in Listing 1.

Listing 1: A guide function for Breakout:

```
def guide_function(obs):
    # Find bar and ball in frame.
    bar_x_left, bar_x_right = \
        find_bar_edges_x(obs)
    ball_x = find_ball (observation)
    if ball_x != None:
        # Where to move bar.
        if bar_x_left > ball_x:
            return [0, 0, 0, 1] # left
        elif bar_x_right < ball_x > 0:
            return [0, 0, 1, 0,] # right
    return [0, 1, 0, 0,] # fire.
```

Listing 2 discloses pseudocode that the agent uses in each step of its training in for choosing between the tutor decision and the policy decision.

Listing 2: Selection of action when training the agent.

```
def select_action (obs, tau, guide_function):
    if numpy.random.uniform( ) < tau:
        # Use tutor.
        tf_output = guide_function (obs)
        action = numpy.argmax (tf_output)
    else:
        # Use policy normally.
        action = policy.select_action( )
    return action
```

Figure 5:
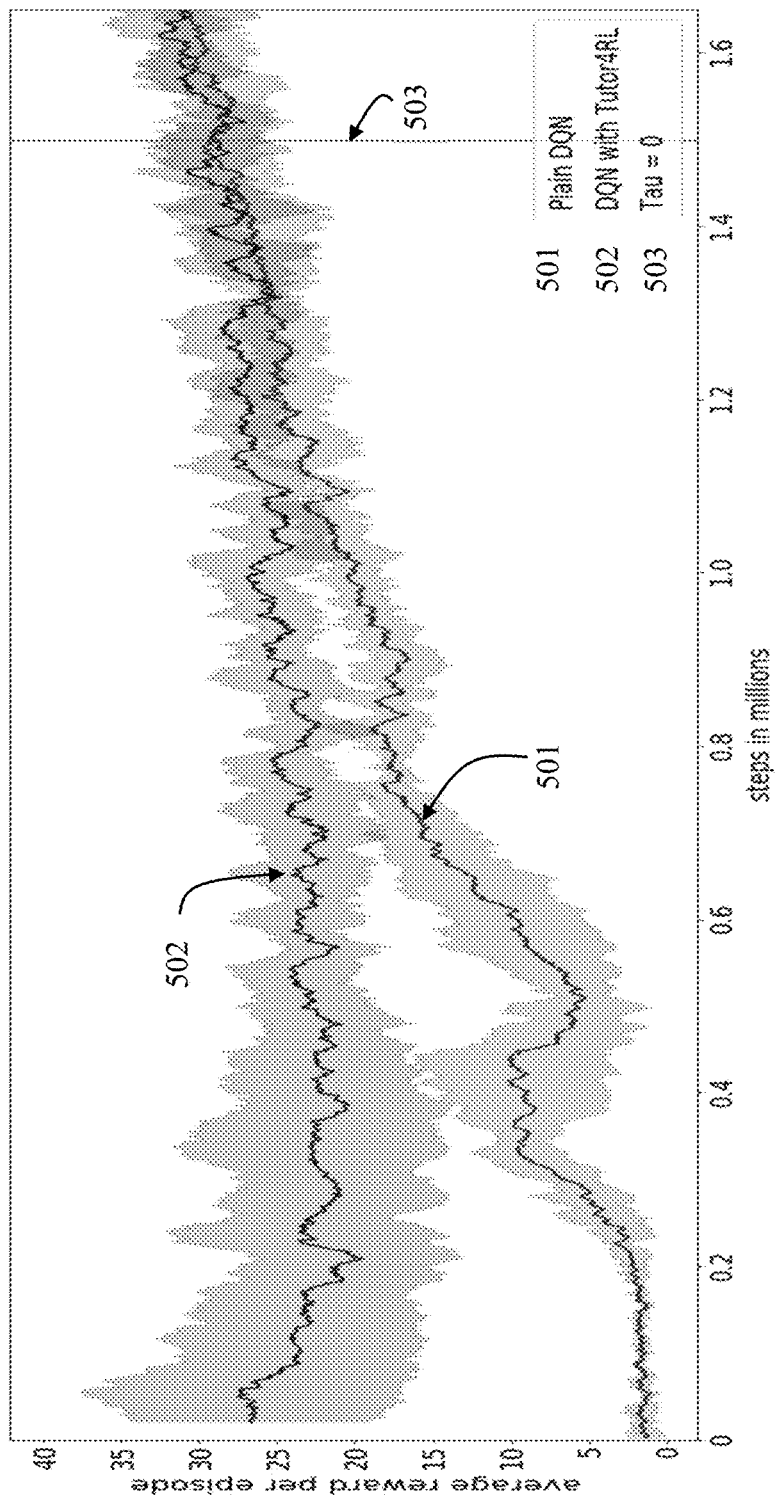
FIG. 5 illustrates a performance of an embodiment of the present invention.

FIG. 5 depicts the mean reward per episode of the plain DQN agent (501) and DQN agent with Tutor4RL (502) during training. During the beginning of the training and until step 500000, the plain DQN Agent shows an expected low reward (<13 points) because it starts with no knowledge of its environment, while the DQN Agent with Tutor4RL—due to the use of its tutor's knowledge—manages to achieve a mean reward between 15 and 26 points (double the maximum of the plain DQN Agent). From step 500000 the plain DQN agent starts to improve, but it's not until step 1.1M that the plain DQN agent shows equally good results as the tutored one. From there a similar reward is given for both agents, with DQN Agent+Tutor4RL achieving a slightly higher mean reward in most cases.

Because $\tau$ is decreased uniformly throughout training, the tutor is used less as training progresses. Finally, in step 1.5M, $\tau=0$ (503) and the tutor is no longer used. It is important to note that from this point on, the reward does not decrease but it keeps improving with the agent's learning. Moreover, we test both agents after 1.75M steps: the plain DQN agent achieves an average reward of 40.75 points while Tutor4RL achieves a reward of 43. Note that this reward comes only from the learned policy of the agents and keeping $\epsilon=0.05$, i.e. no tutor knowledge is used.

Figure 6:
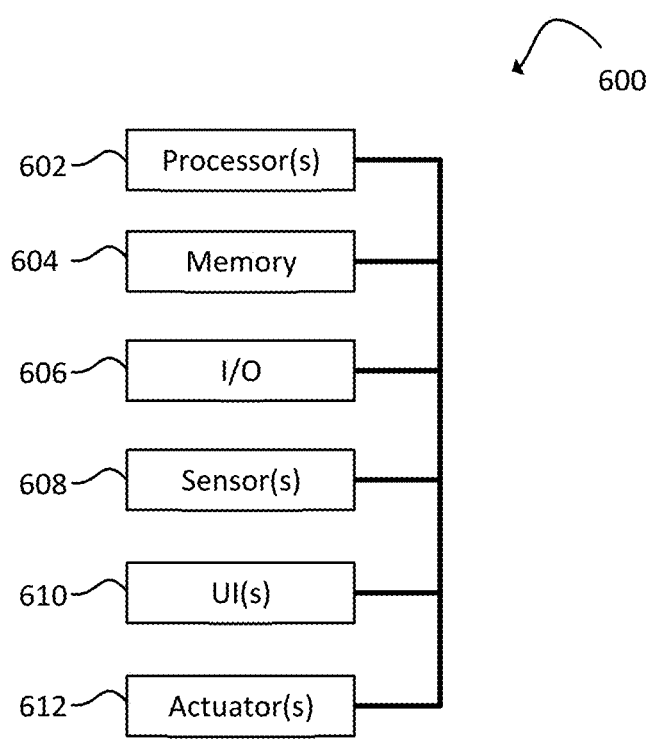
FIG. 6 is a block diagram of an exemplary processing system, which can be configured to perform any and all operations disclosed herein.

Referring to FIG. 6, a processing system 600 can include one or more processors 602, memory 604, one or more input/output devices 606, one or more sensors 608, one or more user interfaces 610, and one or more actuators 612. Processing system 300 can be representative of each computing system disclosed herein.

Processors 602 can include one or more distinct processors, each having one or more cores. Each of the distinct processors can have the same or different structure. Processors 302 can include one or more central processing units (CPUs), one or more graphics processing units (GPUs), circuitry (e.g., application specific integrated circuits (ASICs)), digital signal processors (DSPs), and the like. Processors 602 can be mounted to a common substrate or to multiple different substrates.

Processors 602 are configured to perform a certain function, method, or operation (e.g., are configured to provide for performance of a function, method, or operation) at least when one of the one or more of the distinct processors is capable of performing operations embodying the function, method, or operation. Processors 602 can perform operations embodying the function, method, or operation by, for example, executing code (e.g., interpreting scripts) stored on memory 604 and/or trafficking data through one or more ASICs. Processors 602, and thus processing system 600, can be configured to perform, automatically, any and all functions, methods, and operations disclosed herein. Therefore, processing system 600 can be configured to implement any of (e.g., all of) the protocols, devices, mechanisms, systems, and methods described herein.

For example, when the present disclosure states that a method or device performs task "X" (or that task "X" is performed), such a statement should be understood to disclose that processing system 600 can be configured to perform task "X". Processing system 600 is configured to perform a function, method, or operation at least when processors 602 are configured to do the same.

Memory 604 can include volatile memory, non-volatile memory, and any other medium capable of storing data. Each of the volatile memory, non-volatile memory, and any other type of memory can include multiple different memory devices, located at multiple distinct locations and each having a different structure. Memory 604 can include remotely hosted (e.g., cloud) storage.

Examples of memory 604 include a non-transitory computer-readable media such as RAM, ROM, flash memory, EEPROM, any kind of optical storage disk such as a DVD, a Blu-Ray® disc, magnetic storage, holographic storage, a HDD, a SSD, any medium that can be used to store program code in the form of instructions or data structures, and the like. Any and all of the methods, functions, and operations described herein can be fully embodied in the form of tangible and/or non-transitory machine-readable code (e.g., interpretable scripts) saved in memory 304.

Input-output devices 306 can include any component for trafficking data such as ports, antennas (i.e., transceivers), printed conductive paths, and the like. Input-output devices 606 can enable wired communication via USB®, DisplayPort®, HDMI®, Ethernet, and the like. Input-output devices 606 can enable electronic, optical, magnetic, and holographic, communication with suitable memory 606. Input-output devices 606 can enable wireless communication via WiFi®, Bluetooth®, cellular (e.g., LTE®, CDMA®, GSM®, WiMax®, NFC®), GPS, and the like. Input-output devices 306 can include wired and/or wireless communication pathways.

Sensors 608 can capture physical measurements of environment and report the same to processors 602. User interface 610 can include displays, physical buttons, speakers, microphones, keyboards, and the like. Actuators 612 can enable processors 602 to control mechanical forces.

Processing system 600 can be distributed. For example, some components of processing system 600 can reside in a remote hosted network service (e.g., a cloud computing environment) while other components of processing system 300 can reside in a local computing system. Processing system 600 can have a modular design where certain modules include a plurality of the features/functions shown in FIG. 6. For example, I/O modules can include volatile memory and one or more processors. As another example, individual processor modules can include read-only-memory and/or local caches.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for reinforcement machine learning using a reinforcement learning system comprising an environment and an agent, the agent having a policy providing a mapping between states of the environment and actions, the method comprising:
   determining a current state of the environment;
   determining, using the policy, a current policy output based on the current state;
   determining, using a knowledge function, a current knowledge function output based on the current state;
   determining an action based on the current policy output and the current knowledge function output;
   applying the action to the environment resulting in updating the current state and determining a reward;
   updating the policy based on at least one of the current state and the reward,
   wherein the knowledge function is:
      a constraining function, wherein the constraining function is a programmable function that has been defined to encapsulate a constraint on a behavior of the agent, the constraining function being configured to take as its input the current state and to return an action mask indicating which of the actions are enabled or disabled.

2. The method according to claim 1, wherein prior to first using the knowledge function, the knowledge function is defined to encapsulate external domain knowledge.

3. The method according to claim 1,
   wherein the reinforcement learning system further comprises an ensemble for performing the operation of determining the action,
   wherein the knowledge function is one of M+N knowledge functions comprised of M constraining functions and N guide functions, M and N each being an integer,
   wherein the method further comprises:
      determining, using the constraining functions, M constraining function outputs based on the current state; and
      determining, using the guide functions, N guide function outputs based on at least one of the current state or the reward, and
      wherein the current knowledge function output is one of the constraining function outputs or one of the N guide function outputs,
   wherein each of the N guide functions is a programmable function that has been defined to encapsulate a predetermined domain heuristic for selecting from among the actions based on the current state, each of the guide functions being configured to take as its respective input the at least one of the current state or the reward and to output an action rating, which rates how good each one of at least a subset of the actions is under current conditions, and
   wherein the constraining function is one of the M constraining functions.

4. The method according to claim 3, wherein the operation of determining the action comprises:
   combining the guide function outputs to determine an action rating for each of the actions;
   combining the constraining function outputs to determine an action mask defining which of the actions are enabled and disabled; and
   determining the action based on the current policy output, the action rating, and the action mask.

5. The method according to claim 4,
   wherein each of the guide functions has an associated weight, wherein each of the guide function outputs is a vector of size L, L being the number of actions, wherein combining the guide function outputs comprises:
for each of the guide function outputs, multiplying each entry in the vector by the weight associated with the respective guide function to obtain a weighted guide function output, and
multiplying together the weighted guide function output of each of the guide functions to obtain the action rating, wherein the action rating is a vector of size L that comprises a value for each of the actions, a higher value indicating a higher expected performance as compared to a lower value, wherein each of the constraining function outputs is a vector of size L, each entry in the vector being a 0 or a 1, where a 0 representing disabled and 1 representing enabled, and wherein combining the constraining functions outputs comprises multiplying together each of the constraining function outputs to obtain the action mask in the form of a vector of size L.

6. The method according to claim 5, wherein the weight of each of the guide functions is updated based on at least one of the guide function output, the current state, and the reward.

7. The method according to claim 4, wherein the associated weight of each of the guide functions is determined according to:

$$w_{j,t} = \begin{cases} \max(0, w_{j,t-1} + lr\,r_t) & \text{if } g_j(s_{t-1}, r_{t-1}) = a_{t-1} \\ w_{j,t-1} & \text{otherwise} \end{cases}$$

wherein:
$w_{j,t}$ is the associated weight of a guide function j, of the guide functions, for a current time step t;
lr is a learning rate;
$r_t$ is the reward in the current time step t;
$s_{t-1}$ is a previous state of the environment in a step t−1;
$g_j(s_{t-1}, r_{t-1})$ is the output of the guide function j for the previous state $s_{t-1}$ and a previous reward $r_{t-1}$ at the step t−1; and
$a_{t-1}$ is a previous action executed in the step t−1.

8. The method according to claim 4, wherein the associated weight of each of the guide functions is determined according to:

$$w_{j,l,t} = \begin{cases} \max(0, w_{j,l,t-1} + lr\,r_t) & \text{if } g_j(s_{t-1}, r_{t-1}) = a_{t-1} \wedge a_{t-1} = a_l \\ w_{j,l,t-1} & \text{otherwise} \end{cases}$$

wherein:
$w_{j,l,t}$ is the associated weight for a guide function j, of the guide functions, given an action l and a current time step t;
lr is a learning rate;
$r_t$ is the reward in the current time step t;
$s_{t-1}$ is a previous state of the environment in a step t−1;
$g_j(s_{t-1}, r_{t-1})$ is the output of the guide function j for the previous state $s_{t-1}$ and a previous reward $r_{t-1}$ at the step t−1; and
$a_{t-1}$ is a previous action executed in the step t−1.

9. The method according to claim 4, wherein the associated weight of each of the guide functions is determined according to:

$$w_{j,l,s,t} = \begin{cases} \max(0, w_{j,l,t-1} + lr\,r_t) & \text{if } g_j(s_{t-1}, r_{t-1}) = a_{t-1} \wedge a_{t-1} = a_l \wedge s_{t-1} = s_s \\ w_{j,l,t-1} & \text{otherwise} \end{cases}$$

wherein:
$w_{j,l,s,t}$ is the associated weight for a guide function j, of the guide functions, given an action l, the current state s, and a current time step t;
lr is a learning rate;
$r_t$ is the reward in the current time step t;
$s_{t-1}$ is a previous state of the environment in a step t−1;
$g_j(s_{t-1}, r_{t-1})$ is the output of the guide function j for the previous state $s_{t-1}$ and a previous reward $r_{t-1}$ at the step t−1; and
$a_{t-1}$ is a previous action executed in the step t−1.

10. The method according to claim 3, wherein the ensemble determines the action according to:

$$y_t = \left( \omega \frac{\sum_j^N w_{j,t} g_j(s_t, r_t)}{\max \sum_j^N w_{j,t} g_j(s_t, r_t)} + (1-\omega) \frac{\pi(a_0, a_1, \ldots, a_l \mid s_t)}{\max \pi(a_0, a_1, \ldots, a_l \mid s_t)} \right) \cdot \prod_i^M f_i(s_t)$$

and according to:

$$a_{t+1} = \max_a y_t$$

wherein:
$w_{j,t}$ is the associated weight of a guide function j, of the guide functions, for a current time step t;
lr is a learning rate;
$s_t$ is the current state at the current time step t;
$r_t$ is the reward in step t;
$g_j(s_t, r_t)$ is the output of the guide function j given $s_t$ and $r_t$; and
ω is a that defines an importance of the guide functions with respect to the policy;
$\pi(a_0, a_1, \ldots, a_l \mid s_t)$ is a value yielded for each of the actions by the policy given the current state $s_t$;
$\max \Sigma_j^N w_j^T g_j(s_t)$ selects a maximum value in a vector composed of the weighted outputs of each of the guide functions;
$\max \pi(a_0, a_1, \ldots, a_l \mid s_t)$ selects a maximum yield value for the policy given the current state $s_t$;
$\prod_i^M f_i(s_t)$ represents an element wise product of all of the constraining functions;

$$\max_a y_t$$

represents selecting an action having the maximum value from the vector $y_t$; and
$a_{t+1}$ represents the action that is determined by the ensemble.

11. The method according to claim 10, wherein the parameter ω is 1 in a first step at t=0 and decreases to 0 as steps increase.

12. The method according to claim 1, the method further comprising performing at least one of removing the knowledge function or adding an additional knowledge function during runtime.

13. A non-transitory computer readable medium comprising instructions which are configured such that, when executed by at least one processor, the instructions cause the at least one processor to execute the method of claim 1.

14. The method of claim 1, wherein the knowledge function is the constraining function.

15. The method of claim 1, wherein the knowledge function is the guide function.

16. A system comprising one or more processors which alone or in combination, are configured to provide for execution of a method for reinforcement machine learning using a reinforcement learning system comprising an environment and an agent, the agent having a policy providing a mapping between states of the environment and actions, the method comprising:
 determining a current state of the environment;
 determining, using the policy, a current policy output based on the current state;
 determining, using a knowledge function, a current knowledge function output based on the current state;
 determining an action based on the current policy output and the current knowledge function output;
 applying the action to the environment resulting in updating the current state and determining a reward;
 updating the policy based on at least one of the current state and the reward,
 wherein the knowledge function is:
  a constraining function, wherein the constraining function is a programmable function that has been defined to encapsulate a constraint on a behavior of the agent, the constraining function being configured to take as its input the current state and to return an action mask indicating which of the actions are enabled or disabled.

17. A method for reinforcement machine learning using a reinforcement learning system comprising an environment and an agent, the agent having a policy providing a mapping between states of the environment and actions, the method comprising:
 determining a current state of the environment;
 determining, using the policy, a current policy output based on the current state;
 determining, using a knowledge function, a current knowledge function output based on the current state;
 determining an action based on the current policy output and the current knowledge function output;
 applying the action to the environment resulting in updating the current state and determining a reward;
 updating the policy based on at least one of the current state and the reward,
 wherein the reinforcement learning system further comprises an ensemble for performing the operation of determining the action,
 wherein the knowledge function is one of M+N knowledge functions comprised of M constraining functions and N guide functions, M and N each being an integer,
 wherein the method further comprises:
  determining, using the constraining functions, M constraining function outputs based on the current state; and
  determining, using the guide functions, N guide function outputs based on at least one of the current state or the reward, and
 wherein the current knowledge function output is one of the constraining function outputs or one of the N guide function outputs.

18. A non-transitory computer readable medium comprising instructions which are configured such that, when executed by at least one processor, the instructions cause the at least one processor to execute the method of claim 17.

19. A system comprising one or more processors which alone or in combination, are configured to execute of the method of claim 17.

20. A method for reinforcement machine learning using a reinforcement learning system comprising an environment and an agent, the agent having a policy providing a mapping between states of the environment and actions, the method comprising:
 determining a current state of the environment;
 determining, using the policy, a current policy output based on the current state, the current policy being a vector of size L that comprises an action value for each of the actions in an action space;
 determining, using a guide function, an action rating based on the current state and a previous reward, the guide function being a programmable function that has been defined to encapsulate a predetermined domain heuristic, which was determined external to the reinforcement learning system, for selecting from among actions in the action space based on the current state and the previous reward,
 applying a weight to the action rating;
 determining an action from the action space based on a result of multiplying the current policy output with the weighted action rating;
 applying the action to the environment resulting in updating the current state and determining a reward;
 updating the policy based the current state and the reward; and
 updating the weight based on the current state and the reward;
 wherein the action rating rates how good each one of at least a subset of the actions in the action space is under the current state, and
 wherein the action rating is a vector of size L that comprises a value for each of the actions, a higher value indicating a higher expected performance as compared to a lower value.

21. The method of claim 20, the method further comprising:
 determining, using a constraining function, an action mask indicating which of the actions in the action space are enabled or disabled, the constraining function being a programmable function that has been defined to encapsulate a constraint on a behavior of the agent, the constraining function being configured to take as its input the current state and to return the action mask,
 wherein the determining of the action from the action space further comprises applying the action mask.

* * * * *